US012652701B2

(12) United States Patent
Sukhija et al.

(10) Patent No.: US 12,652,701 B2
(45) Date of Patent: Jun. 9, 2026

(54) AID SYNCHRONIZATION WHEN BSS COLOR SWITCH OCCURS IN A NETWORK

(71) Applicant: MediaTek Singapore Pte. Ltd., Singapore (SG)

(72) Inventors: Vikas Sukhija, Noida (IN); Vinay Garg, Noida (IN); Soumik Das, Noida (IN); Rohit Lagamanna Sannake, Noida (IN)

(73) Assignee: MediaTek Singapore Pte. Ltd., Singapore (SG)

( * ) Notice: Subject to any disclaimer, the term of this patent is extended or adjusted under 35 U.S.C. 154(b) by 345 days.

(21) Appl. No.: 18/407,473

(22) Filed: Jan. 9, 2024

(65) Prior Publication Data

US 2024/0237074 A1     Jul. 11, 2024

(30) Foreign Application Priority Data

Jan. 10, 2023    (IN) .............................. 202321002046

(51) Int. Cl.
  *H04W 74/0808*       (2024.01)
(52) U.S. Cl.
  CPC .............................. *H04W 74/0825* (2013.01)

(58) Field of Classification Search
  CPC .... H04W 8/26; H04W 74/0825; H04W 84/12
  See application file for complete search history.

(56) References Cited

U.S. PATENT DOCUMENTS

| | | | |
|---|---|---|---|
| 2019/0052327 A1* | 2/2019 | Motozuka ............. | H04W 84/12 |
| 2021/0235375 A1* | 7/2021 | Desai ................ | H04W 28/0268 |
| 2024/0064837 A1* | 2/2024 | Kim ....................... | H04L 5/0094 |
| 2024/0137979 A1* | 4/2024 | Kim ....................... | H04L 69/28 |
| 2024/0163948 A1* | 5/2024 | Kim ....................... | H04W 76/11 |
| 2024/0406906 A1* | 12/2024 | Kneckt ................. | H04W 60/04 |

* cited by examiner

*Primary Examiner* — Thomas R Cairns
(74) *Attorney, Agent, or Firm* — Winston Hsu

(57) ABSTRACT

A method for updating an associated ID (AID) in a network when a Basic Service Set (BSS) color change occurs is provided. The network includes an Access Point (AP) and a plurality of associated stations (STAs). The method includes: detecting a color collision; setting a new BSS color in response to the color collision; configuring an AID update request frame, wherein an updated AID according to the new BSS color is inserted into a subElement Information Element (IE) field of the AID update request frame; and sending the AID update request frame to the plurality of associated STAs to inform the associated STAs of the updated AID.

18 Claims, 5 Drawing Sheets

| Category | WNM Action | Dialog Token | Type | SubElement IE |
|---|---|---|---|---|

WNM Action = WNM Notification Req

| AID_UPDATE_IE | Element ID | Length | AID |
|---|---|---|---|
| | 1 | 1 | 2 |

AID Update Request Frame Format

| Category | WNM Action | Dialog Token | Type | SubElement IE |
|----------|------------|--------------|------|---------------|

WNM Action = WNM Notification Req

| AID_UPDATE_IE | Element ID | Length | AID |
|---------------|------------|--------|-----|
| | 1 | 1 | 2 |

AID Update Request Frame Format

| Category | WNM Action | Dialog Token | Response Status |
|----------|------------|--------------|-----------------|

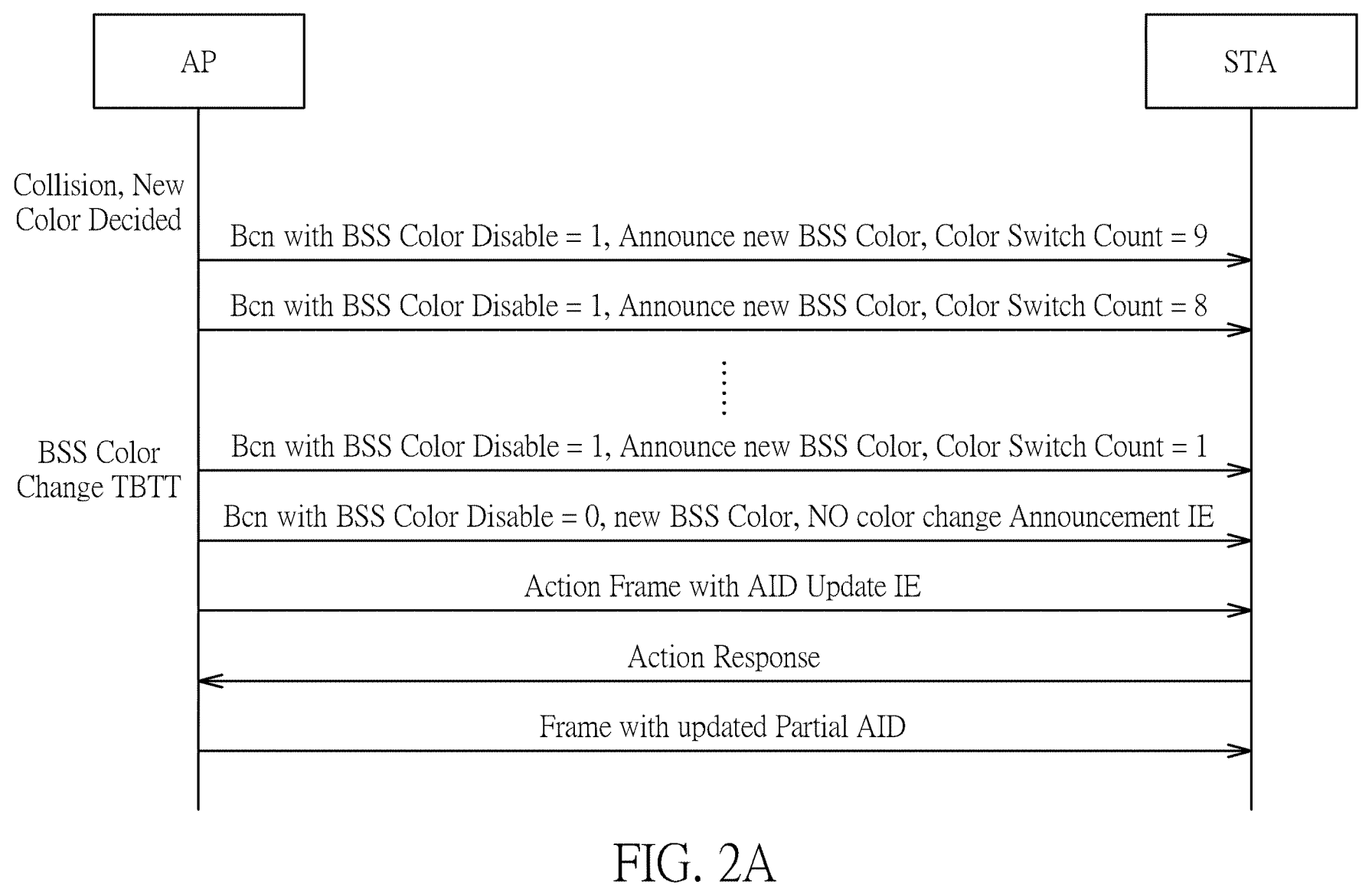

STA

AP

Collision, New
Color Decided

Bcn with BSS Color Disable = 1, Announce new BSS Color, Color Switch Count = 9

Bcn with BSS Color Disable = 1, Announce new BSS Color, Color Switch Count = 8

......

Bcn with BSS Color Disable = 1, Announce new BSS Color, Color Switch Count = 1

BSS Color
Change TBTT

Bcn with BSS Color Disable = 0, new BSS Color, NO color change Announcement IE

Action Frame with AID Update IE

Action Response

Frame with updated Partial AID

FIG. 2A

AID SYNCHRONIZATION WHEN BSS COLOR SWITCH OCCURS IN A NETWORK

BACKGROUND

The invention is directed to wireless communication, and more particularly, to updating a partial AID when a BSS Color change occurs.

In a wireless network, a Basic Service Set (BSS) is a set of wireless devices/stations (STAs) which can communicate with each other within the network via an access point (AP). Due to the high density of Wi-Fi devices, there may be overlapping BSS (OBSS), wherein more than one AP and their client devices can hear transmission from each other in the same channel (also known as co-channel interference). In order for a device to distinguish between frames belonging to their associated BSS and frames from an OBSS, communications between devices within a BSS can have a set BSS color.

Associated STAs receive beacon, probe response and re-association frames from the AP, which contain a partial associated ID (AID) which is assigned according to the BSS color. By comparing the BSS color with the partial AID in the received frames/packets, the STAs can know if received traffic is from a device within the same BSS (called intra-BSS traffic), in which case the receiver will defer transmissions, or whether the received traffic is from a device outside the same BSS (called inter-BSS traffic), in which case the device does not need to defer transmissions.

If a same BSS color is set for overlapping BSSs (i.e. different BSS which share a same channel), this will result in a color collision. In this case, a color change needs to be initiated. There is, however, no current mechanism to directly update the AID when the BSS color changes. The partial AID will therefore be asynchronous with the updated BSS color. This means that a STA may mistakenly identify intra-BSS traffic as inter-BSS, or vice versa. Currently, the only solution is to disconnect and then reconnect the associated devices, which is inefficient as it will cause service interruption, particularly when there are many devices operating within the BSS.

It is therefore an objective in this field to provide a method and system for updating a partial AID when a BSS Color within a network changes, without requiring disconnection of associated devices.

SUMMARY

The invention therefore provides a method and system for synchronizing the AID of all devices within a BSS when there is a BSS Color change.

In a first aspect of the invention, a method for updating an associated ID (AID) in a network when a Basic Service Set (BSS) color change occurs is provided. The method comprises: determining that a color collision has occurred; setting a new BSS color in response to the color collision; configuring an AID update request frame, wherein an updated AID according to the new BSS color is inserted into the AID update request frame; and sending the AID update request frame for informing the updated AID.

In another aspect of the present invention, a method is disclosed for configuring an AID update request frame when a color collision in a Basic Service Set (BSS) in a network is detected. The method comprises: configuring a subElement Information Element (IE) field to comprise an associated ID (AID) subfield to generate the AID update request frame; determining an updated AID according to a new BSS color; inserting the updated AID into the AID subfield of the AID update request frame; and sending the AID update request frame within the BSS for informing the updated AID.

In a third aspect of the invention, a wireless communications system is configured as an access point (AP) for a Basic Service Set (BSS) in a network. The wireless communications system comprises: a control circuit, configured to update an associated ID (AID) according to a new BSS color which is set when a color collision occurs within the network, configure an AID update request frame, and insert the updated AID into an AID subfield of the AID update request frame; and a transceiver, coupled to the control circuit, and configured to send the AID update request frame for informing the updated AID.

These and other objectives of the present invention will no doubt become obvious to those of ordinary skill in the art after reading the following detailed description of the preferred embodiment that is illustrated in the various figures and drawings.

BRIEF DESCRIPTION OF THE DRAWINGS

FIG. 2A is a diagram of frames exchanged between a STA and an AP when color collision occurs in a BSS and the AP initiates updating the AID according to an exemplary embodiment of the present invention.

DETAILED DESCRIPTION

BSS color information is written in a High Efficiency (HE) operation information element (IE) subfield, wherein the HE Operation IE can be found in Beacon, Probe Response and (Re) Association frames. When a partial BSS color subfield in the HE operation IE is set to 1, an associated ID (AID) assignment rule is set depending on the BSS color, as shown by the following equation:

$$\mathrm{AID}\,(5{:}8 = \mathit{bin}\big[\big(BCB(0{:}3) - \big(BSSID\,[44{:}47]\oplus BSSID\,[40{:}43]\big)\big)\mathrm{mod}\ 24,\,4\big]$$

In the above equation, BCB represents partial color bits. The AID is set as (8−N+1:8), wherein N represents the partial BSS color length and can be a value of 1, 2, 3, or 4. The AID is used to generate a partial AID which will be written in the VHT-SIG-A field of a VHT PPDU packet, wherein bits [5:8] of the partial AID represent the 4 least significant bits of the BSS color (i.e. partial BSS color or BSS Color [0:3]).

The method of the present invention utilizes the fact that the BSS color bits (BCB) will change when the BSS Color changes, but the BSSID remains the same. Due to the existing BSS color change procedure, the new BSS color will be known by all devices within the network. By using the partial AID assignment rule, a new AID can be calculated using the new BSS color.

As both the AP and the associated STAs will know the new BSS color, a first solution to the problem of disconnection and reconnection upon BSS color change is for all associated devices within the network to individually calculate the new AID. All devices can then update the AID field with the new value in all PPDUs to be sent.

Although this method means that both the AP and associated STAs can immediately proceed to send PPDUs with the updated AID, if there is any delay in calculation for either the AP or STAs, the problem of the related art wherein a packet is misidentified may still occur. This method relies on an assumption that a peer device has completed updating of the AID.

Therefore, the present invention proposes a method wherein only the AP needs to calculate the updated AID, and this updated AID is sent in an AID update request frame from the AP to every associated STA. Upon receiving the AID update request frame, the STAs will update their AID, and send an AID update response frame to the AP confirming that updating has taken place. This method therefore requires two extra frames to be exchanged between the AP and the STA. In this way, it can be confirmed that all peer devices are aware of the updated AID and new BSS color before further frame exchange occurs.

In another aspect of the invention, a management frame for updating the AID is proposed, called an AID Update Request Frame. In the following, an action frame is used as an exemplary embodiment. As is well-known, an Information Element (IE) is located at the end of such frames, wherein the format of different IEs is identified by the Element ID.

Figures 1A, 1B:
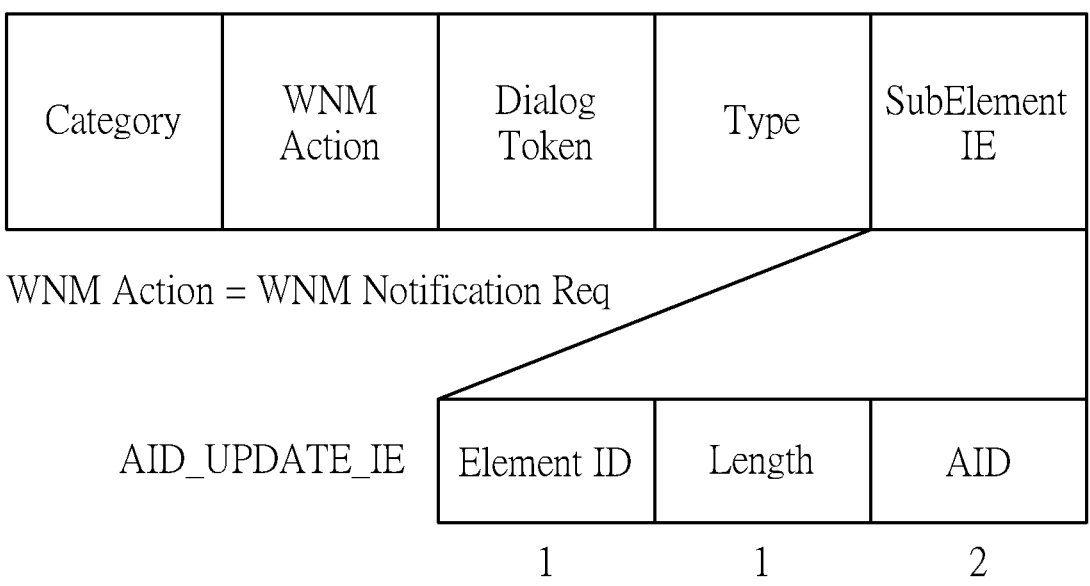
FIG. 1A is a diagram of a frame sent by an AP containing an updated AID according to an exemplary embodiment of the present invention.
FIG. 1B is a diagram of a frame sent by a STA in response to receiving the frame illustrated in FIG. 1A according to an exemplary embodiment of the present invention.

Refer to FIG. 1A, which is a diagram of an AID Update Request Frame according to an exemplary embodiment of the present invention. The frame contains the following fields: Category; Wireless Network Management (WNM) Action; Dialog Token; Type and SubElement IE. The WNM Action is a WNM Notification Request. Please note that this is merely one example of a frame for informing the STA of the BSS Color change, but the AP may use any type of frame from the group comprising Management frames, Action frames, Data frames and Proprietary frames, or Proprietary IEs in any existing frame.

The SubElement IE has a length of 4 bytes, and is divided into three sub-fields as illustrated in FIG. 1A. The sub-fields are an Element ID (1 byte), Length (1 byte) and AID (2 bytes). The SubElement IE field is renamed an AID UPDATE IE field.

The AID_UPDATE_IE field contains information of the updated AID, which is calculated by the AP according to the newly assigned BSS Color. The AP can therefore directly inform the STA of the new AID which will be used. Once the AID update request is received, the STA can directly update its AID. The STA will then send a response frame to the AP, as illustrated in FIG. 1B.

FIG. 1B illustrates the format of an AID Update Response Frame sent by an STA. The frame comprises the following fields: Category; WNM Action; Dialog Token; and Response Status. Response Status will include confirmation from the STA that the updated AID has been received. As above, the WNM Action is a WNM Notification Response, but this is merely one example of a frame for responding to the AP, and the STA may use any type of frame from the group comprising Management frames, Action frames, Data frames and Proprietary frames, or Proprietary IEs in any existing frame.

By using the SubElement IE field in an existing frame such as a Management frame, the present invention does not need to perform disconnection and reconnection upon a BSS Color Change. In addition, by generating the AID update response frame, the AP can confirm that the updated AID has been received before sending out packets with the new BSS color.

Refer to FIG. 2A, which illustrates the frames sent between an AP and an STA upon detecting a Color Collision when the AP initiates updating the AID. As is well-known, a new BSS color is decided when a color collision is detected, which is done by setting a value of a BSS Color subfield within an HE Operation element to 1 for informing associated STAs that BSS Color is disabled. The HE Operation element further comprises a BSS color change announcement element containing a Color Switch Countdown field which tells the associated clients/STAs how many more beacons the AP will transmit before the BSS color change occurs (a value from 1~9), and a New BSS Color subfield containing the numerical value of the new BSS color.

The AP sends a first Beacon Frame with the BSS Color Disable field set to 1, indicating that a new BSS Color will be set. In addition, the Beacon includes a Color Switch count=9, which indicates that the color change will occur in 9 frames. The next beacon frame similarly has the BSS Color Disable field set to 1, and the color switch count is reduced by 1 (i.e. color switch count=8). 7 more beacon frames are sent with the color switch count successively decrementing by 1. The beacon frame immediately following the beacon frame with the color switch count=1 will have the BSS Color Disable field=0, indicating there is no color change announcement, and a new BSS color.

The frame immediately following this frame is the proposed AID update request frame (WNM Action frame in FIG. 2A) including the AID_UPDATE_IE. As detailed above, the AP uses the new BSS Color to calculate the updated AID, and this is recorded in the AID_UPDATE_IE sub-field for directly informing the STA of the new color.

The STA then sends an AID update response frame (WNM Action Response frame in FIG. 2A) to acknowledge the AID Update IE has been received. The AP can then send a frame/packet with the updated Partial AID. When this Partial AID is compared with the least significant bits of the new BSS color (the BCB), the frame/packet will be correctly identified by the STA as comprising intra-BSS traffic.

Figure 2B:
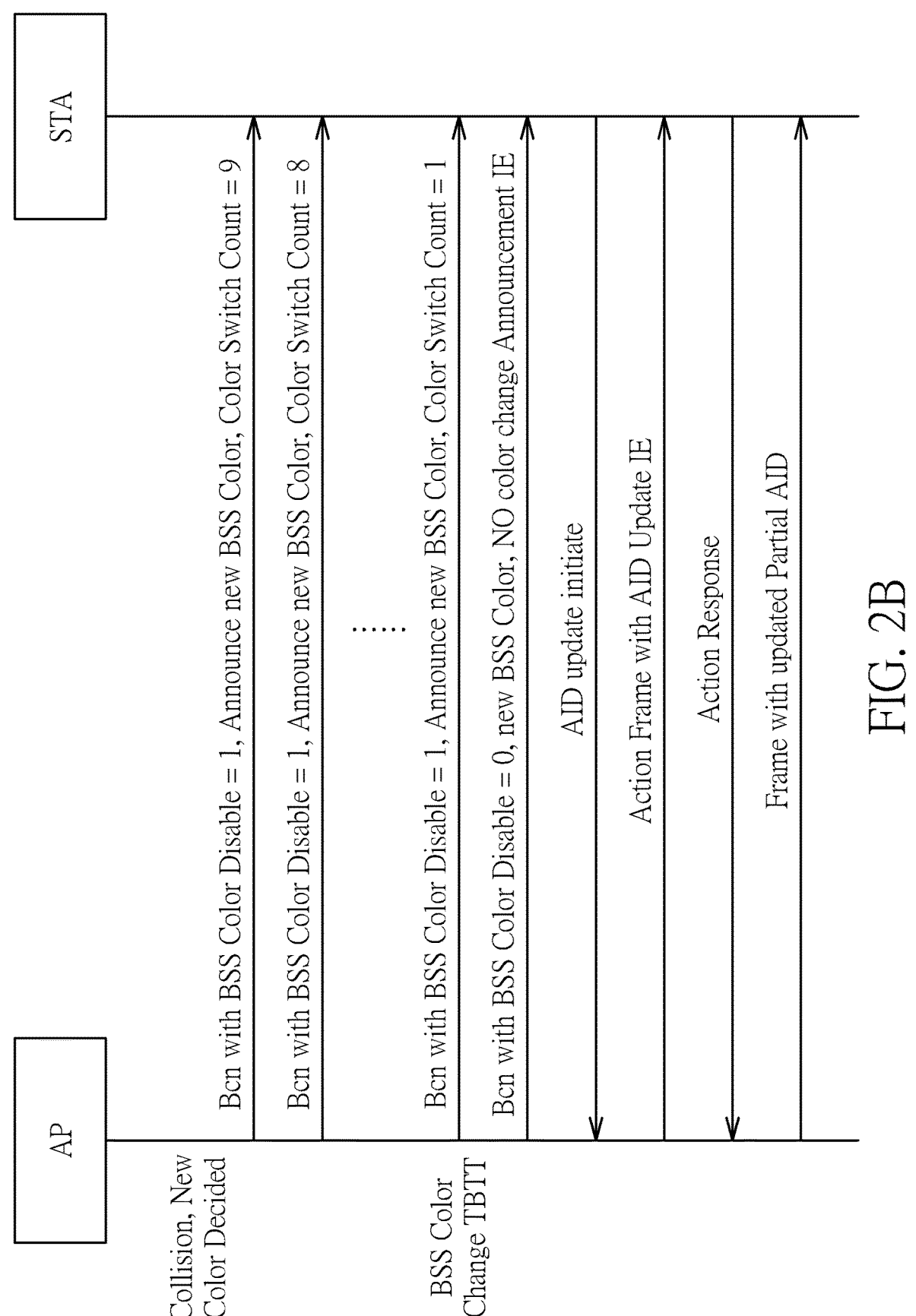
FIG. 2B is a diagram of frames exchanged between a STA and an AP when color collision occurs in a BSS and the STA initiates updating the AID according to an exemplary embodiment of the present invention.

In the above description, the AP instigates the updating of the AID when a new BSS color is announced. In a modification of this method, the STA can initiate the AP to update the AID by sending a management frame in response to the new BSS color being announced, as illustrated in FIG. 2B. In FIG. 2B, after the beacon frame with the BSS Color Disable field=0 and a new BSS color is sent, the STA will send an AID update initiate frame, which triggers the AP to update the AID, and then configure the AID update request frame as detailed above.

Figure 3:
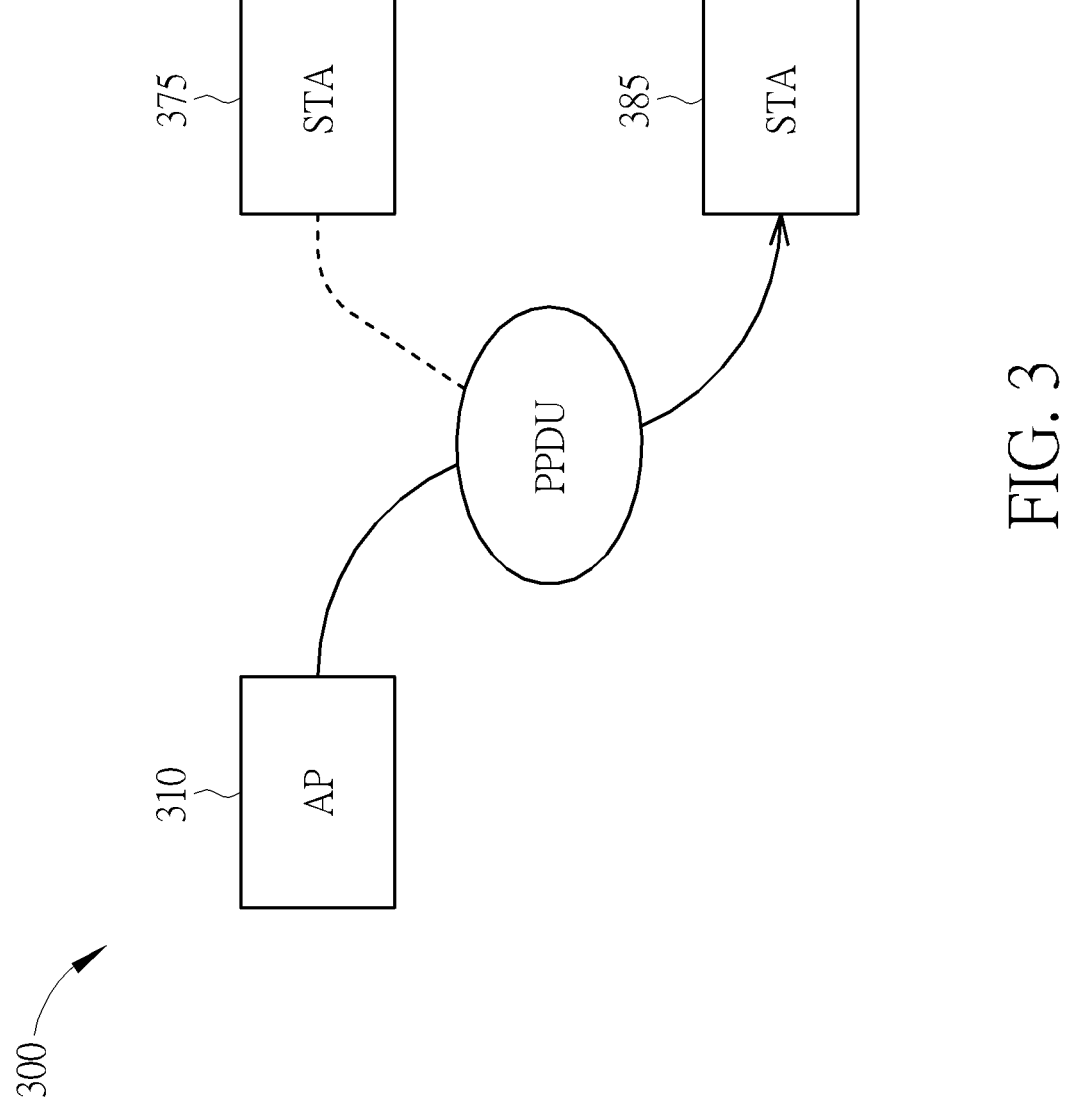
FIG. 3 is a diagram of a wireless communications system in a same BSS within a network according to an exemplary embodiment of the present invention.

Refer to FIG. 3, which is an illustration of a wireless communications system 300 comprising a plurality of wireless communications devices in a same BSS within a network for carrying out the above method. As shown in FIG. 3, the wireless communications system 300 comprises an Access Point (AP) device 310, a station (STA) device 375, and a STA 385. In one example, the AP is a High Efficiency (HE) AP, the STA 375 is an HE STA, and the AP 385 is a Very High Throughput (VHT) STA, but the invention is not limited thereto. The AP 310 transmits a VHT PPDU, which can be received by both the STA 375 and the STA 385. Please note that, although two STAs 375 and 385 are shown in this diagram, the method and system of the present invention can be implemented in a wireless communications system with more than two STAs, wherein these STAs may comprise more than one HE STA and more than one VHT STA. FIG. 3 is merely provided as an example. As is well-known, the HE standard is the successor to the VHT standard, and is specifically designed to work in high user density environments, wherein one of the features of the HE standard is the BSS color. The HE STA 375 can use the partial AID contained within the VHT PPDU to sense that the packet comprises intra-BSS traffic by comparing the partial AID with the current BSS color.

By employing the method of the present invention, the partial AID contained within the PPDU can be updated by the AP 310 upon a change in BSS color, such that there will not be a situation where a partial AID contained in a PPDU does not match the BSS color and the PPDU is erroneously sensed by a STA as inter-BSS traffic even when it comes from an AP within the same BSS. Moreover, this updating of the partial AID by the AP 310 can prevent the need for disconnecting and reconnecting the wireless communications system 300.

Figure 4:
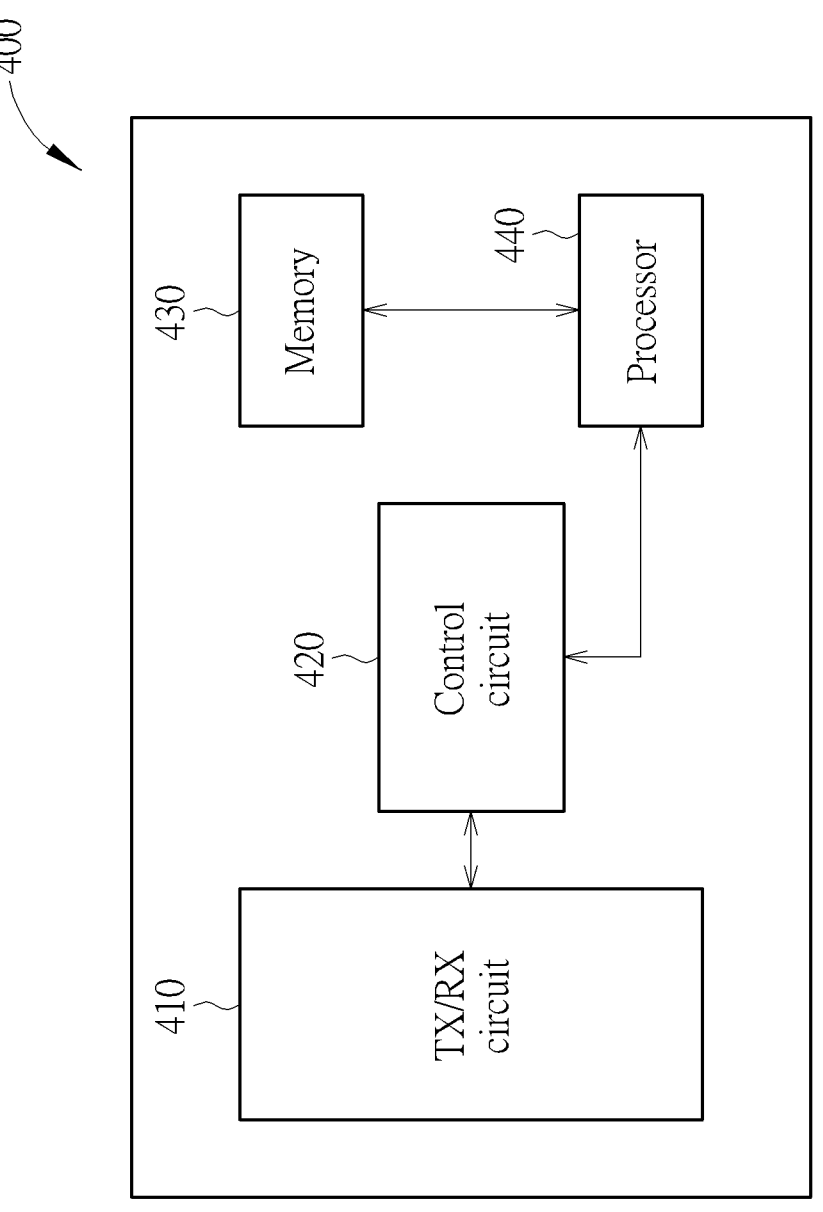
FIG. 4 is a block diagram of a wireless communications device shown in FIG. 3.

Refer to FIG. 4, which is a diagram of a wireless communications device 400 which may be an example of the AP 310 or the STAS 375 and 385 illustrated in FIG. 3. The wireless communications device 400 comprises a transceiver 410, a control circuit 420, a memory 430 and a processor 440. The transceiver 410 is configured to send the AID update request frames and receive the AID update initiate and AID update response frames, as well as the beacon frames. The control circuit 420 is configured to update the AID in response to detecting a color collision, and configure the management frame as the AID update request frame, wherein the updated AID is inserted into an AID subfield of the AID update request frame.

The above method and wireless communications system enables synchronization of the AID for all STAs within a BSS upon BSS color change, and does not require disconnecting and reconnecting of all devices within the BSS when a BSS color change occurs. Efficiency and speed of wireless transmissions can thereby be maintained.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method for updating an associated identifier (ID) (AID) in a network when a Basic Service Set (BSS) color change occurs, the method comprising:
 determining that a color collision has occurred;
 setting a another BSS color in response to the color collision;
 configuring an AID update request frame, wherein an updated AID determined according to the other BSS color is inserted into the AID update request frame; and
 sending the AID update request frame for informing the updated AID.

2. The method of claim 1, wherein the step of inserting the updated AID into the AID update request frame comprises:

configuring a subfield of a sub Element Information Element (IE) field of the AID update request frame as an AID subfield; and
 inserting the updated AID into the AID subfield.

3. The method of claim 1, further comprising:
 in response to sending the AID update request frame, receiving an AID update response frame, wherein the AID update response frame comprises a response status field indicating the updated AID has been received.

4. The method of claim 3, wherein the AID update request frame and AID update response frame are any one of a management frame, an action frame, a data frame and a proprietary frame.

5. The method of claim 1, wherein the step of configuring an AID update request frame comprises:
 calculating the updated AID according to the other BSS color and an AID assignment rule.

6. The method of claim 1, wherein the step of setting a another BSS color in response to the color collision comprises:
 sending a plurality of beacon frames announcing the other BSS color and including a color switch count indicating how many frames will be sent before the other BSS color is used; and
 sending a beacon frame with the other BSS color;
 wherein the step of configuring the AID update request frame is initiated by an Access Point (AP) upon sending the beacon frame with the other BSS color.

7. The method of claim 6, further comprising:
 after sending the beacon frame with the other BSS color, receiving an AID update initiate frame;
 wherein the step of configuring the AID update request frame is performed in response to receiving the AID update initiate frame.

8. A method for configuring a beacon frame as an associated identifier (ID) (AID) update request frame when a color collision in a Basic Service Set (BSS) in a network is detected, the method comprising:
 configuring a subElement Information Element (IE) field to comprise an AID subfield to generate the AID update request frame;
 determining an updated AID according to a new another BSS color;
 inserting the updated AID into the AID subfield of the AID update request frame; and
 sending the AID update request frame within the BSS for informing the updated AID.

9. The method of claim 8, wherein the subElement IE field of the AID update request frame further comprises:
 an element ID subfield; and
 a length subfield.

10. The method of claim 8, further comprising:
 in response to sending the AID update request frame, receiving a plurality of AID update response frames
 wherein each AID update response frame comprises a response status field indicating whether the updated AID has been received.

11. The method of claim 10, wherein the AID update request frames and AID update response frames are any one of a management frame, an action frame, a data frame and a proprietary frame.

12. The method of claim 8, wherein the AID subfield of the AID update request frame comprises 2 bytes.

13. A wireless communications device configured as an access point (AP) for a Basic Service Set (BSS) in a network, the wireless communications device comprising:

a control circuit, configured to update an associated identifier (ID) (AID) according to a another BSS color which is set when a color collision occurs within the network, configure an AID update request frame, and insert the updated AID into an AID subfield of the AID update request frame; and a transceiver, coupled to the control circuit, and configured to send the AID update request frame for informing the updated AID.

14. The wireless communications device of claim 13, wherein the transceiver is further configured to, in response to the color collision, send a plurality of beacon frames announcing the other BSS color and including a color switch count indicating how many beacon frames will be sent before the other BSS color is used, send a beacon frame with the other BSS color, and receive an AID update response frame in response to the AID update request frame;

wherein the control circuit frame configures the AID update request frame after sending the beacon frame with the other BSS color.

15. The wireless communications device of claim 14, wherein the transceiver is further configured to receive an AID update initiate frame after sending the beacon frame with the other BSS color; and the control circuit is further configured to configure the AID update request frame in response to receiving the AID update initiate frame.

16. The wireless communications device of claim 15, wherein the AID update request frames and AID update response frames are any one of a management frame, an action frame, a data frame, and a proprietary frame.

17. The wireless communications device of claim 13, wherein the AID subfield is contained in a subElement Information Element (IE) of the AID update request frame.

18. The wireless communications device of claim 13, wherein the AP is a High Efficiency (HE) AP, and the HE AP communicates by sending Very High Throughput (VHT) data packets.

* * * * *